United States Patent
Wayt et al.

(10) Patent No.: US 7,330,853 B2
(45) Date of Patent: Feb. 12, 2008

(54) ATTRIBUTE VALUE SELECTION FOR ENTITY OBJECTS

(75) Inventors: Edward H. Wayt, Seattle, WA (US); James H. Booth, Barrie (CA); Kevin Ralph Miller, Bellevue, WA (US); Kim Cameron, Bellevue, WA (US); Max L. Benson, Redmond, WA (US); Matthias Leibmann, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 10/434,725

(22) Filed: May 8, 2003

(65) Prior Publication Data
US 2004/0225663 A1 Nov. 11, 2004

(51) Int. Cl.
*G06F 17/40* (2006.01)
(52) U.S. Cl. .............. 707/102; 707/104.1; 715/501.1
(58) Field of Classification Search ........... 707/3, 707/4, 10, 101, 102, 103 R, 104.1, 201; 703/3; 715/501.1
See application file for complete search history.

(56) References Cited

U.S. PATENT DOCUMENTS

| | | | |
|---|---|---|---|
| 4,999,766 A * | 3/1991 | Peters et al. ............... 707/10 |
| 5,893,116 A | 4/1999 | Simmonds et al. |
| 6,185,574 B1 * | 2/2001 | Howard et al. ............. 707/200 |
| 6,202,085 B1 | 3/2001 | Benson et al. |
| 6,269,406 B1 | 7/2001 | Dutcher et al. |
| 6,343,287 B1 | 1/2002 | Kumar et al. |
| 6,381,734 B1 | 4/2002 | Golde et al. |
| 6,496,837 B1 * | 12/2002 | Howard et al. ............. 707/200 |
| 6,523,042 B2 | 2/2003 | Milleker et al. |
| 6,523,046 B2 | 2/2003 | Liu et al. |
| 6,542,515 B1 | 4/2003 | Kumar et al. |
| 6,651,047 B1 | 11/2003 | Weschler, Jr. |
| 6,757,720 B1 | 6/2004 | Weschler, Jr. |
| 6,823,336 B1 | 11/2004 | Srinivasan et al. |
| 6,859,217 B2 | 2/2005 | Robertson et al. |
| 6,983,227 B1 * | 1/2006 | Thalhammer-Reyero ....... 703/2 |
| 6,990,513 B2 * | 1/2006 | Belfiore et al. ............. 709/203 |
| 2001/0034733 A1 | 10/2001 | Prompt et al. |
| 2002/0030703 A1 | 3/2002 | Robertson et al. |
| 2002/0059425 A1 | 5/2002 | Belfiore et al. |
| 2002/0156792 A1 | 10/2002 | Gombocz et al. |
| 2003/0105654 A1 | 6/2003 | MacLeod et al. |
| 2003/0131025 A1 | 7/2003 | Zondervan et al. |
| 2003/0140210 A1 | 7/2003 | Testardi |
| 2004/0064502 A1 | 4/2004 | Yellepeddy et al. |
| 2004/0230559 A1 | 11/2004 | Newman et al. |
| 2005/0188367 A1 | 8/2005 | Oberholtzer |

OTHER PUBLICATIONS

Robertson, George; Cameron, Kim; Czerwinski, Mary; Robbins, Daniel; "Polyarchy Visualization: Visualizing Multiple Intersecting Hierarchies"; CHI 2002, Minneapolis, Minnesota, USA; Apr. 20-25, 2002; 8 pages.

(Continued)

*Primary Examiner*—Shahid Al Alam
(74) *Attorney, Agent, or Firm*—Lee & Hayes, PLLC (57) ABSTRACT

Systems and methods for populating attribute value fields in an entity object employ in a ranked list of transfer options to determine which of a plurality of transfer options will be used to populate the attribute value fields in the entity object.

12 Claims, 8 Drawing Sheets

OTHER PUBLICATIONS

Zhou, "Directory Integration and the Metadirectory", 1999, pp. 1-12.

Steen et al., Master Thesis in Computer Engineering; Integrating ABB Aspect Directory with Microsoft Active Directory; 76 pages.

Steen et al. "Integrating ABB Aspect Directory with Microsoft Active Directory", Thesis Paper, The Department of Computer Science and Electronics, Malardalens Hogeskola University, 2001, pp. 44-58.

* cited by examiner

ATTRIBUTE VALUE SELECTION FOR ENTITY OBJECTS

CROSS-REFERENCE TO RELATED APPLICATION

The present invention is related to co-pending U.S. patent application Ser. No. 10/435,113, entitled "Declarative Rules for Metadirectory," by Kim Cameron, Max L. Benson, and James H. Booth; U.S. patent application Ser. No. 10/434,726, entitled "Relational Directory," by Kim Cameron, James H. Booth, Matthias Leibmann, Max L. Benson and Mark Brown; U.S. patent application Ser. No. 10/435,720, entitled "Associating and Using Information in a Metadirectory," by Max L. Benson; U.S. patent application Ser. No. 10/435,712, entitled "Preview Mode," by Kim Cameron, Max L. Benson, Derek Murman, Edward H. Wayt, Jeffery Bisset, Jie Liu, and Jing Wu; U.S. patent application Ser. No. 10/435,708, entitled "Rules Customization and Related Methods," by Kim Cameron, Matthias Leibmann, Max L. Benson, Jing Wu, Michael Jerger, Edward H. Wayt, and Kenneth Mark U.S. patent application Ser. No. 10/434,411, entitled "Automated Information Management and Related Methods," by Stephen Siu, Max L. Benson, and James H. Booth, all of which are filed concurrently herewith, assigned to the assignee of the present invention, and incorporated herein by reference for all that they teach and disclose.

TECHNICAL FIELD

The described subject matter relates generally to systems, methods, and data structures for storing and/or processing information.

BACKGROUND

Companies and other organizations typically maintain information about many different aspects of the organization in order to ensure efficient operation. This organizational information may include information that describes various entities, such as people, resources, applications, and the like, which make up the organization. For example, organizational information descriptive of an employee may include his/her name, job title, salary, telephone number, and/or internet protocol (IP) address. Organizational information describing an application may include the application's name and associated services provided by the application. Organizational information describing a resource may describe the resource as a network device (e.g., a printer), the name of the device, and capabilities provided by the network device. Many other types of organizational information may be maintained.

The organizational information is typically maintained in a number of data storage repositories. For example, the human resources (HR) department may have a data repository including information about each of the employees in the company. The information technology (IT) department may have a data repository of all passwords and internet protocol (IP) addresses associated with employees, applications, resources, etc. In a typical organization, each of the data repositories is independently maintained by the department that owns the repository. For example, the HR department maintains its own employee information, while the IT department maintains its own network information. However, data stored in these repositories frequently overlap, meaning that some information may be common among more than one repository.

Because each of the various data repositories is independently maintained by the department that owns the data repository, and there may be data common among them, inconsistencies may arise among the data repositories. For example, the HR department repository may have employee "John Smith," and may list an email address of "johns@company.com;" the IT department may initially have John Smith's email address as "johns@company.com," but may change the address to "johnsm@company.com" when another employee, "John Simpson," joins the company. Thus, when the IT department changes John Smith's email address in the IT repository, the email address is no longer consistent with John Smith's email address in the HR department repository. For many other reasons, information stored in data repositories may become inconsistent within an organization. Thus, organizations typically attempt to manage their various data repositories so as to keep the information in them consistent, as well as up-to-date, accurate, and readily available.

In theory, in order to efficiently and effectively manage organizational data, the various data repositories could be replaced with one large repository, modifiable by the various organizational departments; however, this solution is impractical for a few reasons. First, in practice, political boundaries associated with departments in a typical organization make this solution impractical because departments typically want to control their own data. Second, departments are typically modeled on a division of labor model, wherein each department has expertise only with regard to the information with which the department is concerned. Thus, it is impractical to have, for example, the HR department updating IP address and email address information in one large repository.

As a result, traditional systems for managing an organization's data repositories and their associated organizational information involve linking the multiple repositories, while allowing the departments to independently modify their own repositories. In a traditional system, data from each of a number of repositories (remote repositories) is read by an associated interface that negotiates between the repository and a central repository that represents a combination of data in all the repositories. Each of the interfaces moves data from its associated remote repositories into the central repository.

As will be appreciated, in order to maintain a consistent and well ordered representation of the combined data in the central repository, some form of control must be establish over which data from which remote repositories is to be written to the central repository. In this regard, traditional systems often use the "authoritative source model," in deciding which data is written to the central repository. In accordance with the authoritative source model, one remote repository is designated as the authoritative source for each given unit of data in the central repository. That is, one remote repository, or its associated interface, is given permission to modify the given unit of data in the central repository. For example, in an organization having an IT department repository and an HR department repository, the IT department repository may be designated as the authoritative source for employee telephone information in employee records in a central repository, while an HR department repository may be designated as the authoritative source for employee passwords in the employee records in the central repository.

In a typical system using the authoritative source model, the manner in which an authoritative source is actualized in the system is by coding the designated authoritative source into one or more processes in the system, using scripts and the like. Unfortunately, this makes changing the authoritative source difficult and/or time consuming. Furthermore, since the authoritative source model only allows for one authoritative source to be assigned to a given unit of data, that unit of data may remain out of date for some time if the designated authoritative source is off-line or otherwise inaccessible by the system.

SUMMARY

Described herein are various systems, methods and data structures that facilitate consistent and well ordered representation of combined data in a central repository. In accordance with one embodiment, a method writes an attribute value to an attribute in a central data repository in accordance with a given transfer option if the given transfer option of the attribute value is determined to be the highest ranked transfer option in a ranked list of transfer options.

DETAILED DESCRIPTION

In general, the systems, methods, and data structures described herein facilitate consistent and well ordered storage of common or related data in a computing environment. In accordance with various embodiments, data structures, referred to herein as an entity objects, are maintained in a central data repository. Each entity object includes information related or common to a given entity. Associated with each entity object, and residing in data repositories that are remote from the central repository, are one or more related data structures, referred to herein as record objects. Each entity object includes data that is received, and/or derived, from one or more of its associated record objects.

Figure 1:
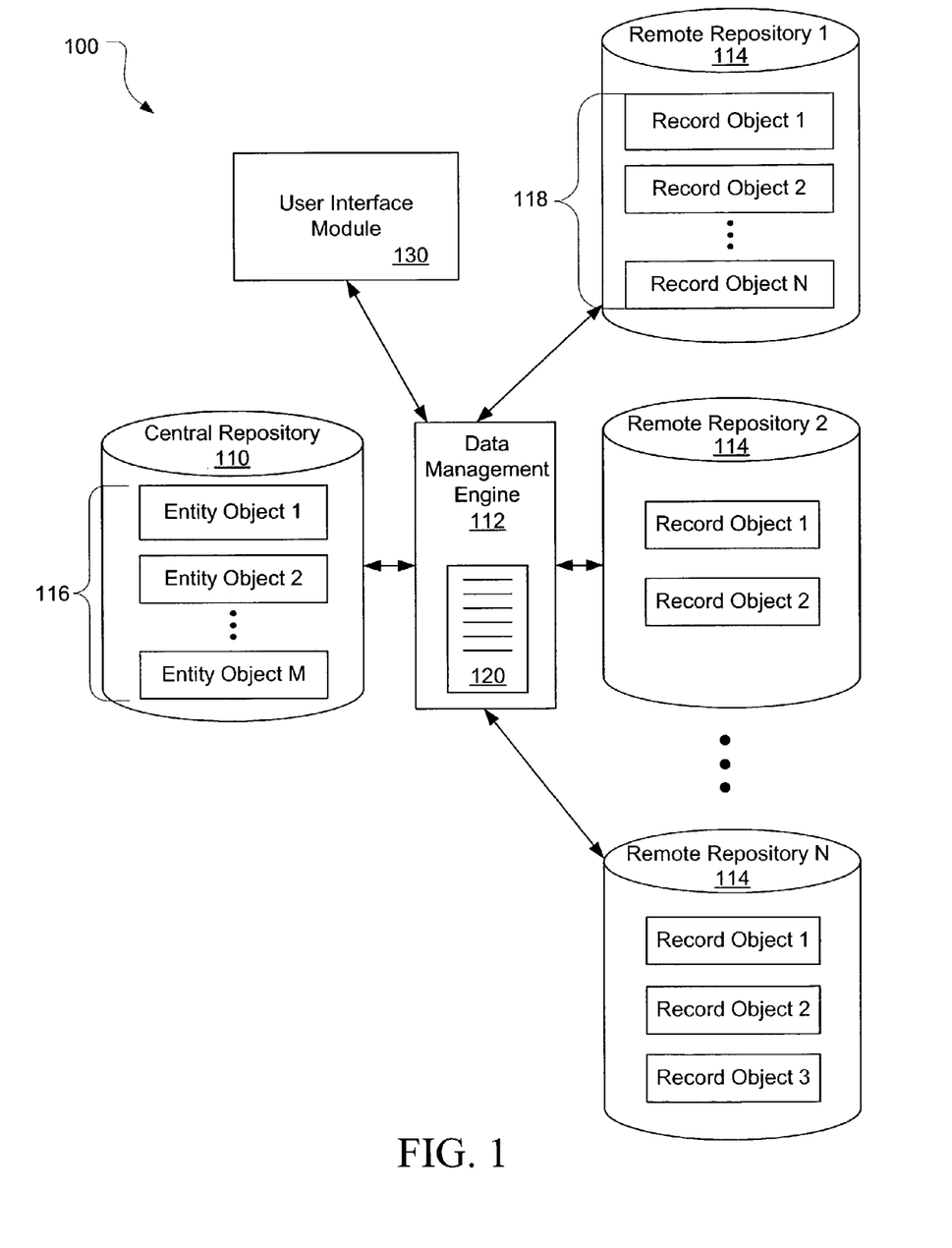
FIG. 1 illustrates an exemplary embodiment of a data object storage system.

Turning now to FIG. 1, illustrated therein is one embodiment of an exemplary data object storage system 100. Included in the data object storage system 100 are a central data repository 110, a data management engine 112, a number of remote data repositories 114, and a user interface module 130. As shown, the central data repository 110 is in operable communication with the data management engine 112, which in turn is in operable communication with each of the remote data repositories 114. As also shown, the data management engine 112 is in operable communication with the user interface module 130.

In accordance with one implementation, the central data repository 110 and the remote data repositories 114 each comprise, contain, or reside in computer-readable media. As used herein, computer-readable media may be any available media that can store and/or embody computer executable instructions and that may be accessed by a computing system or computing process. Computer-readable media may include, without limitation, both volatile and nonvolatile media, removable and non-removable media, and modulated data signals. The term "modulated data signal" refers to a signal that has one or more of its characteristics set or changed in such a manner as to encode information in the signal.

The central data repository 110 and the remote data repositories 114 may each comprise, contain, or reside in different computer-readable media. For example, and without limitation, the central data repository 110 and the remote data repositories 114 may reside on different data storage devices. Alternatively, the central data repository 110 and the remote data repositories 114 may reside on a single data storage device or array of data storage devices. The central and remote data repositories may also either be managed by different computer systems or processes, or identical systems or processes. For example, in accordance with one embodiment, the central data repository 110 and the remote data repositories 114 each comprise entities in a single database. Put another way, the remote data repository and the central data repository 114 are separately addressable.

Stored in the central data repository 110 are a number of entity objects 116. Stored in each of the remote data repositories 114 are a number of record objects 118. Each of the entity objects 116 in the central data repository 110 is linked to one or more record objects in the remote repositories 114. That is, each entity object 116 is associated in some manner in the data object storage system 100 with a record object in one or more of the remote repositories 114. In accordance with one embodiment, the entity objects 116 and the record objects 118 comprise data structures embodied in the computer readable media of their respective repositories.

In one implementation, the data management engine 112 is composed of computer executable instructions that are stored or embodied in one or more types of computer readable-media and executed by a computing process in a computing device or networked computing environment ("computing system"). In general, the data management engine 112 handles the processing and/or transfer of data between the entity objects 116 and the record objects 118. In particular, the data management engine 112 determines or specifies whether and what data will be transferred between a given entity object 116 and its associated record objects 118, and how that information will be transferred. In accordance with one embodiment, the data management engine 112 makes the determination using a precedence data structure 120, which is described in detail below. Additionally, the data management engine 112 includes appropriate logic and programming to communicate with the user interface module 130.

The user interface module 130 communicates with the data management engine 112, and provides user access to functions of the data management engine 112. The user interface module 130 may employ a graphical user interface (GUI) rendered on a display device, such as shown and discussed below with respect to FIGS. 6-7. The GUI employs common controls such as the drop-down menus, text boxes, and buttons, etc. In one embodiment, the user interface includes a web browser application to present the GUI. The user interface module 130 may further include other elements such as input elements, e.g., keyboards, touch screens, touch pads, mice, among others.

Generally, the data management engine 112 may include various routines, programs, objects, components, data structures, etc., that perform particular tasks or operations or implement particular abstract data types. For example, in one implementation the data management engine 112 performs the operations illustrated in FIG. 4. The data management engine 112 may be executed or implemented in a single computing device or in a distributed computing environment, where tasks are performed by remote processing devices or systems that are linked through a communications network.

It should be understood that while the data management engine 112 is described herein as comprising computer executable instructions embodied in computer readable media, the data management engine 112, and any or all of the functions or operations performed thereby, may likewise be embodied all or in part as interconnected machine logic circuits or circuit modules within a computing device. Stated another way, it is contemplated that the data management engine 112 and its operations and functions, may be implemented as hardware, software, firmware, or various combinations of hardware, software, and/or firmware. The implementation is a matter of choice dependent on performance requirements of the data object storage system 100.

Figure 2:
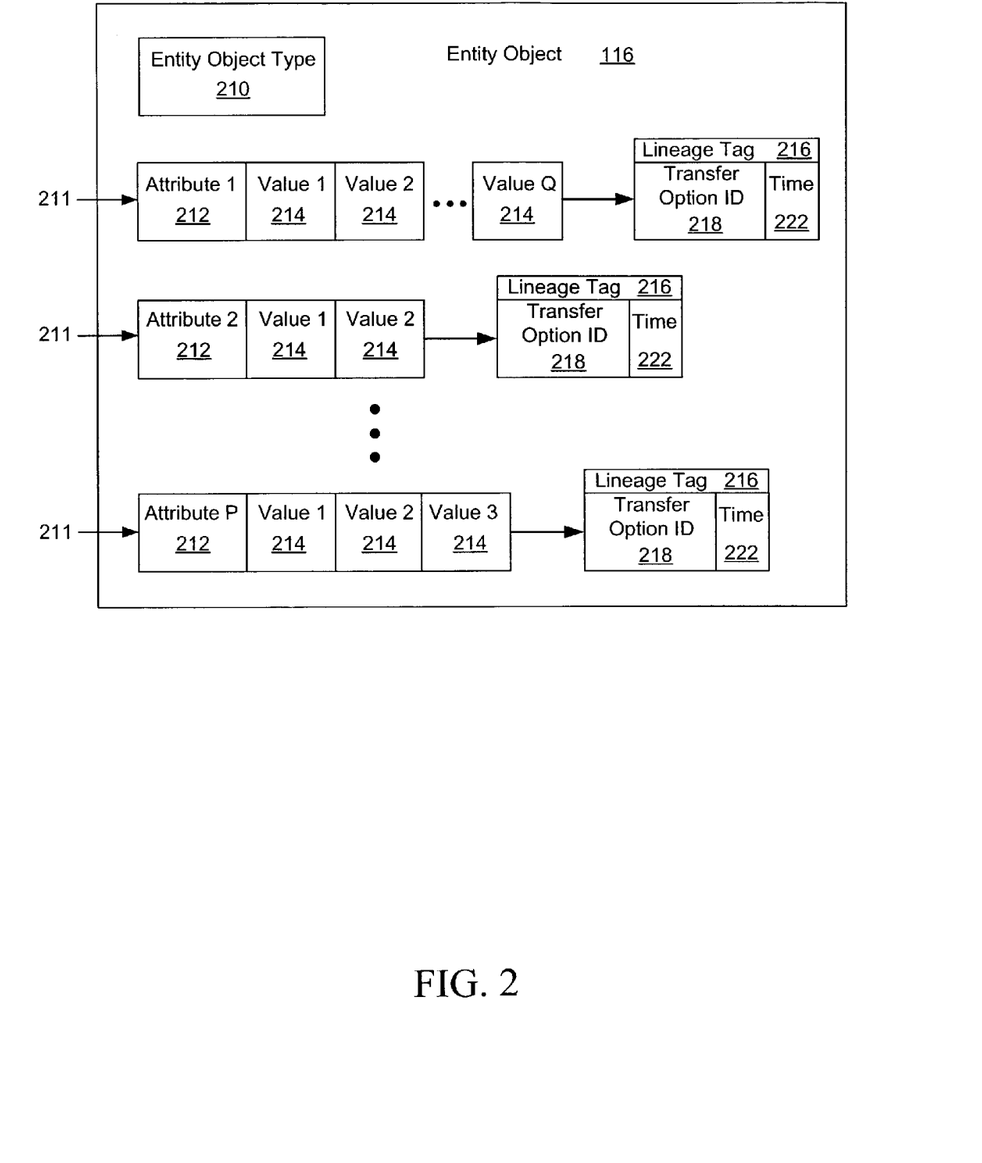
FIG. 2 illustrates an exemplary entity object data structure in accordance with the data object storage system of FIG. 1.

Turning now to FIG. 2, illustrated therein is an exemplary embodiment of an entity object 116. As shown, the exemplary embodiment includes an entity object type field 210 and a number of entity attributes. The object type field 210 stores an object type identifier that specifies the object's type. For example, and without limitation, the object type might indicate that the object includes information related to a person, a resource, an application, or the like. As shown, each entity attribute 211 includes, or has associated therewith, an entity attribute name field 212 and one or more entity attribute value fields 214. Each entity attribute name field 212 stores the name of the entity attribute 211 to which it is included or associated. Each entity attribute value field 214 stores an entity attribute value associated with the attribute to which it is included or associated. As described in greater detail below, each entity attribute value is derived from one or more associated record attributes in associated data records.

As also shown in FIG. 2, in accordance with one embodiment, each entity attribute 211 also includes, or has associated therewith, and a lineage tag 216. In accordance with another embodiment, although not particularly shown in FIG. 2, rather than being associated with the entity attributes, lineage tags 216 may be associated with individual attribute value fields. For example, in accordance with one embodiment, a lineage tag 216 is associated with each individual attribute value field in, or associated with, an entity attribute.

In accordance with one embodiment, each lineage tag 216 includes historical information concerning the attribute or attribute value to which it is included or associated. For example, and without limitation, in accordance with one embodiment, each lineage tag 216 includes a transfer option identifier field or fields 218 and/or a time field 222. Each transfer option identifier field(s) 218 stores a transfer option identifier, which specifies a particular transfer option that was used to populate the attribute or attribute value(s) to which it is associated. The composition and function of transfer option identifiers are discussed in detail to below. As will be appreciated, transfer option identifiers may have various formats. For example, and without limitation, a transfer option identifier may comprise a Globally Unique Identifier (GUID), or the like.

Figure 3:
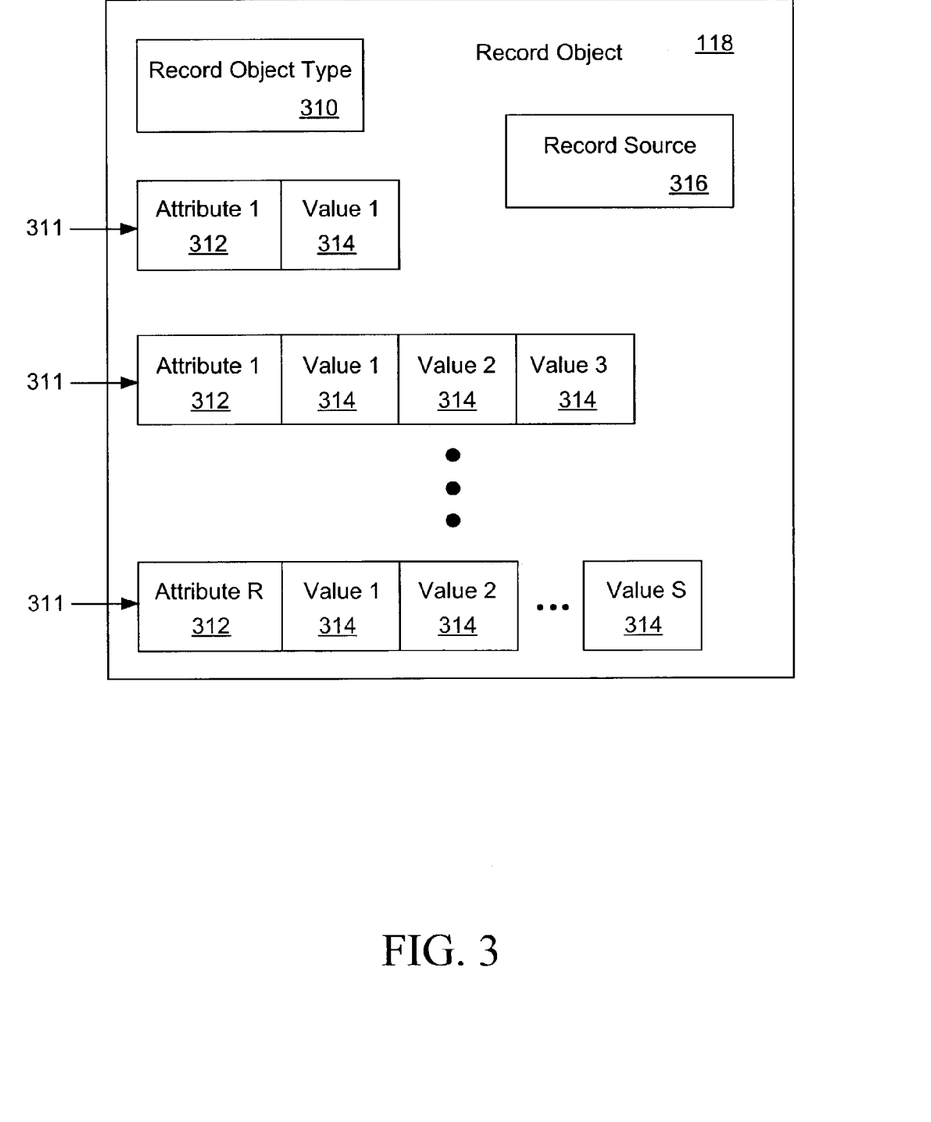
FIG. 3 illustrates an exemplary record object data structure in accordance with the data object storage system of FIG. 1.

Turning now to FIG. 3, illustrated therein is an exemplary embodiment of a record object 118. Included in this exemplary record object 118 are a record object type field 310, a record object source field 316, and a number of attributes 311. The record object type field 310 stores an object type identifier that specifies the record object's type. The record object source field 316 stores a record object source identifier. In accordance with one embodiment, the record object source identifier specifies or indicates the process, system, or logic that created or wrote the record object to the remote repository.

As described, the exemplary record object 118 includes a number of record attributes 312. Each record attribute includes, or has associated therewith, an record attribute name field 312 and one or more record attribute value fields 314. Record attribute name fields 312 store the names of the record attributes to which they are included or associated. Record attribute value fields 314 store record attribute values for the record attributes to which they are included or associated.

As previously described, in accordance with one embodiment, the data management engine 112 uses the precedence data structure 120 to determine which data will be transferred between a given entity object 116 and a particular record object 118, and how that information will be transferred. In general, the precedence data structure 120 comprises a number of transfer options. Each to transfer option identifies or includes an entity attribute population rule that specifies the manner or algorithm that will be used by the data management engine 112 to populate attribute value field(s) in an entity object to which it is applied.

In addition, each transfer option includes a set of transfer requirements that must be met for the data management engine 112 to use the transfer option to populate a given entity object attribute(s) with values from a particular record object attribute(s). In accordance with one embodiment, the set of transfer requirements comprises a number of transfer requirement identifiers. Each transfer requirement identifier specifies, among other things, a characteristic of a record object or a characteristic of an entity object. For example, and without limitation, a transfer requirement identifier may identify a record object type, an entity object type, an attribute identifier, a storage location of a record object prior to its inclusion in a remote repository, the process or logic that was used to store a record object in its remote repository ("record object source"), or a propagation rule that is to be used for populating entity attribute field(s) in accordance with the transfer option.

In general, the management engine 112 selects a transfer option in the process of populating an entity attribute value or values if one or more transfer requirement identifiers in the transfer option are appropriate for a given entity or record object, attribute, and/or attribute value(s). In accordance with one embodiment, the management engine 112 selects a transfer option from a ranked list of transfer options in the precedence data structure 120. In accordance with this embodiment, each transfer option is positioned or associated in the precedence data structure 120 according to a relative ranking of the transfer options. The ranking of the transfer options in the precedence data structure 120 may be according to, or based on, any one of the transfer requirement identifiers. For example, and without limitation, the transfer options may be ranked according to record object sources. In such a case, the transfer options may be arranged or associated in the precedence data structure 120 such that the most preferred transfer option is examined first by the management engine 112 for a given entity attribute, the second most preferred transfer option is examined second by the management engine 112 for a given entity attribute, etc, and so on.

Figure 4:
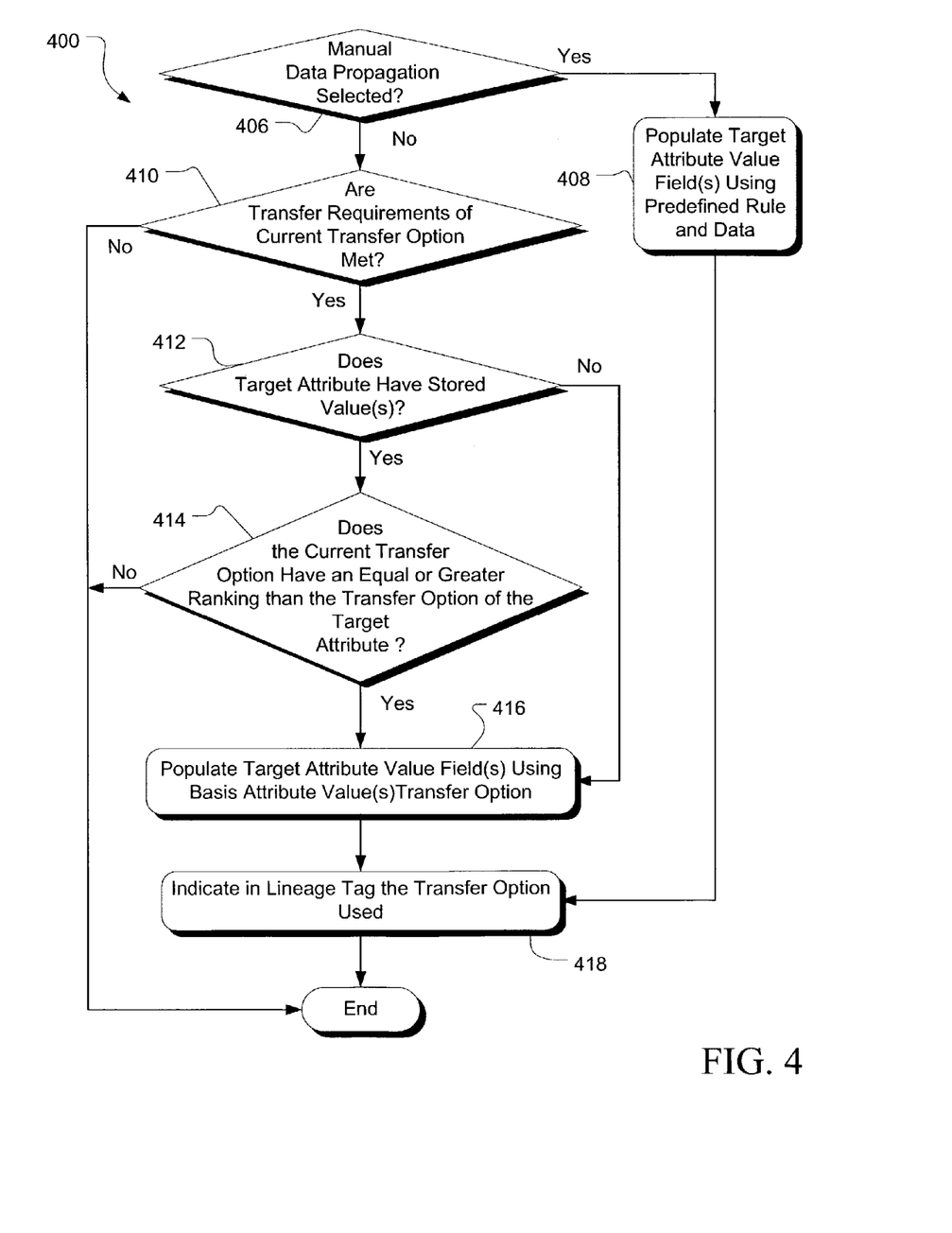
FIG. 4 illustrates an exemplary operation flow that may be carried out in or by the data object storage system of FIG. 1.

Turning now to FIG. 4, illustrated therein is an operational flow including operations that may be performed by the data management engine 112 described above with respect to FIG. 1. The operational flow 400 illustrates operations that may be performed with respect to populating the entity attribute value field(s) 214 of an entity object 116 with data received or derived from record attribute values in an associated record object 118. The initiation of the operations of the operational flow 400 may result from various occurrences, instructions, or state changes in the data object storage system 100. For example, and without limitation, the operational flow 400 may be initiated as a result of a change in an attribute value in a record object or an entity object. As another example, the operational flow 400 may be initiated as a result of a populate instruction being received by, or generated in, the data management engine 112.

As noted, in accordance with one embodiment, the operational flow 400 is carried out with respect to a single entity attribute 211 ("target attribute") and a corresponding or associated record attribute 311 ("basis attribute"). In accordance with one implementation, the operational flow is also performed with respect to one transfer option in a ranked list of transfer options (the "current transfer option"). In accordance with this embodiment, the operational flow 400 may be continued with respect to each transfer option in the list of transfer operations until a predetermined criterion is met. The predetermined criteria may differ depending on the form or function of the entity and/or record objects, or the requirements of the data object storage system 100. For example, in accordance with one implementation, the predetermined criteria may be the successful population of one or more target attribute values.

As shown in FIG. 4, at the beginning of the operational flow 400 a manual data populate operation 406 determines if manual data propagation has been specified or indicated for the entity attribute(s) being examined. This determination may be made in a number of ways. For example, an indicator bit or value, which is accessible to the data management engine 112, may be set by a user indicating that manual data propagation has been specified or indicated for the entity object, the entity attribute, or one or more of the entity attribute values.

If it is determined that a manual data propagation has been specified or indicated, a manual propagate target operation 408 then populates the target attribute with data according to a predefined population rule or algorithm. The predefined population rule or algorithm may be included in the data object storage system 100, such as in the precedence data structure 120. Alternatively, the predefined population rule or algorithm may be a rule that is located remote from the data object storage system 100, such as at a user location. The manual populate operation 408 provides a manner in which the target attribute may be populated when, for example, a user wishes to specify an alternative attribute population rule for a particular entity attribute.

If it is determined in the alternate data attribute determination operation 406 that manual attribute population has not been specified or indicated, a transfer requirement determination operation 410 determines if the transfer requirements of the current transfer option are met. A detailed discussion of transfer requirements, and how they may be met, is set forth above. If it is determined that the transfer requirements for the current transfer option are not met, the operational flow ends. If, however, it is determined that transfer requirements for the current transfer option are met, a value determination operation 412 determines whether any of the target attribute value field(s) 214 is/are populated with attribute data.

If it is determined that the target attribute value field(s) 214 are not populated with attribute data, the operational flow proceeds to a populate operation 416, described below. If, however, it is determined by the value determination operation 412 that the target attribute 211 includes attribute values in any of the target attribute value field(s) 214, a transfer rank operation 414 determines whether the rank of the current transfer option is higher than or equal to the rank of the transfer option of the target attribute. This determination may be made by examining the lineage tag of the target attribute and comparing the location of the transfer option of the target attribute in the ranked list with the location of the current transfer option in the ranked list.

If it is determined that the current transfer option is not higher than or equal to the rank of the transfer option of the target attribute in the ranked list, the operation flow ends. However, if it is determined that the current transfer option is higher than or equal to the rank of the transfer option of the target attribute, a populate target operation 416 then populates the target attribute according to a attribute population rule included in or specified by the current transfer option. Following the populate target operation 416, a lineage tag update operation 418 updates the lineage tag of the target attribute to indicate the transfer option that was used to populate the target attribute. That is, the lineage tag update operation 418 updates the lineage tag of the target attribute to indicate that the current transfer option was used to populate the target attribute. Additionally, the update operation 418 may update the time identifier in the lineage tag to indicate the time the target attribute was populated. Following the lineage tag update operation 418, the operational flow ends.

Figure 5:
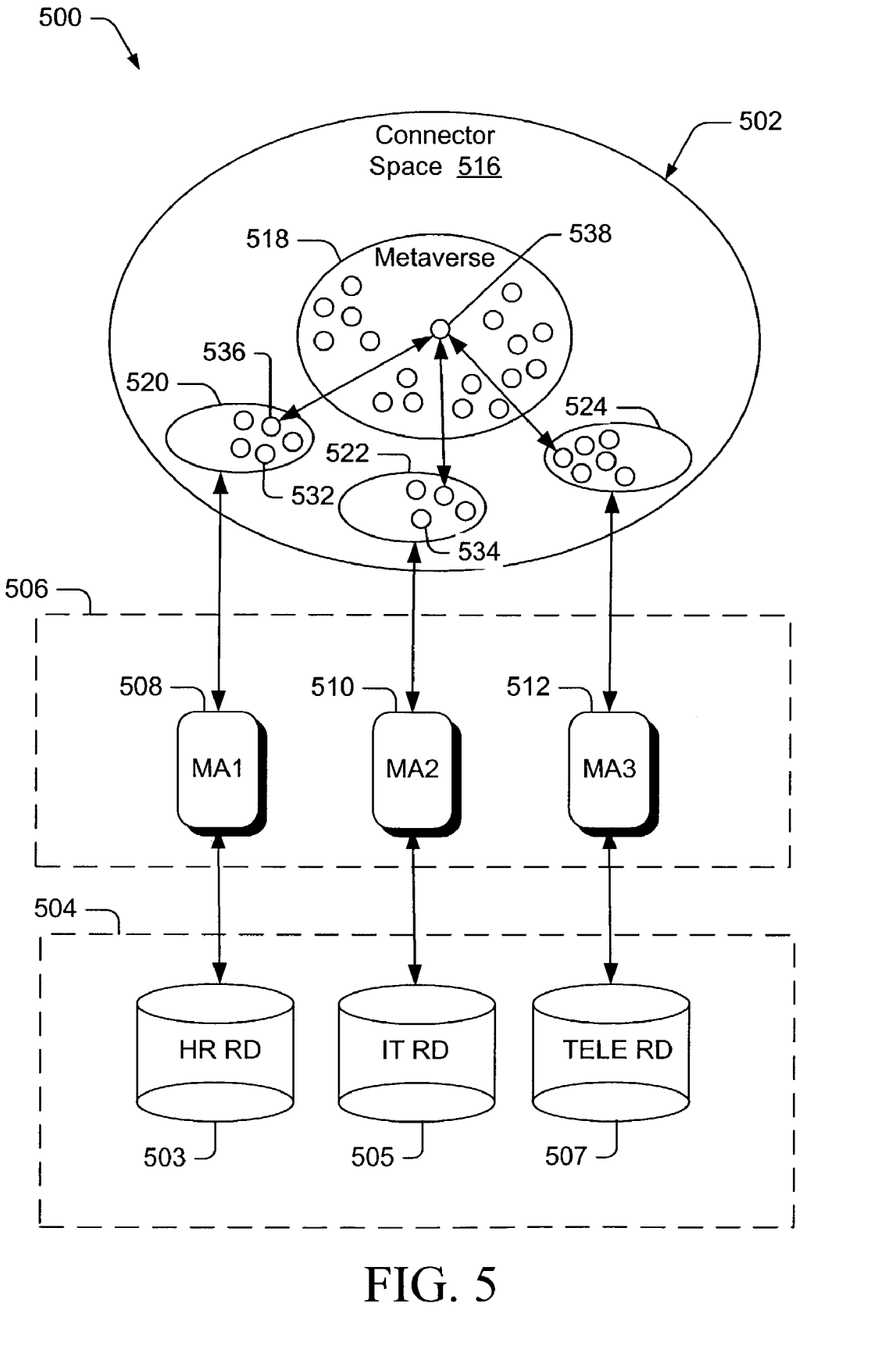
FIG. 5 illustrates an exemplary operating environment in which the data object storage system of FIG. 1 may be implemented.

Turning now to FIG. 5, illustrated therein is another exemplary operating environment 500 in which the various systems, methods, and data structures described above with respect to FIGS. 1-4 may be implemented. In particular, the environment illustrated in FIG. 5 comprises what is referred to as a metadirectory. As shown in FIG. 5, the metadirectory is a networked environment including a central data storage space 502, a number of connected directories (CDs) 504, and a number of management agents (MAs) 506. As will be described, the central data storage space 502 serves as, among other things, a central repository for data objects created and maintained in the exemplary operating environment 500.

In accordance with this embodiment, each CD 504 comprises or includes computer readable media. Typically, each CD 504 will be associated with, and store data and data objects created by, a separate computer system or computer process. For example, the HR CD 503 may be associated with one or more computer processes or computer systems in a human resources (HR) department, the IT CD 505 may be associated with one or more computer processes or computer systems in a information technology (IT) department, and the TELE CD 507 may be associated with one or more computer processes or computer systems involved in a telephone system.

As shown, the data storage environment 502 is partitioned, or otherwise divided, into a first namespace, called a connector space (CS) 516, and a second namespace, called a metaverse 518. The connector space 516 is further partitioned, or otherwise divided, into one or more connector space (CS) regions 520, 522, and 524. In accordance with this embodiment, each connector space region is an exemplary implementation of a remote data repository 114 described above, and the metaverse is an exemplary implementation of the central data repository 110 described above.

Each MA 506 is associated with a single CD and a single CS region, and provides communication between a CD and its associated CS region. For example, MA1 508 provides communication between the HR CD 503 and the CS region 520, MA2 510 provides communication between the IT CD 505 and the CS region 522, and MA3 512 provides communication between the TELE CD 507 and the CS region 524.

Each of the MAs uses the MA's associated connector space region to import, and otherwise process record objects, such as the record objects 118 described above, from the MA's associated CD into the MA's associated CS region. For example, MA1 imports data objects from the HR RD 503 and populates CS1 520 with associated record objects. The MAs may import record objects from the CDs at any time. For example, the MAs may import record objects periodically, or upon the occurrence of a specified event, such as power-up, or user request. Each of the MAs may import record objects independently from the other. In one exemplary implementation, MA2 510 imports record objects from IT CD 505 whenever IT CD 504 powers up, while MA3 512 imports record objects from telephone CD 506 once per day. In another exemplary implementation, a user may initiate a simultaneous import at MA1, MA2, and MA3. With respect to the various systems methods described above with respect to FIGS. 1-4, in accordance with one embodiment, an MA is defined as the source of each record object it imports into a CS.

To illustrate and exemplary metadirectory operation, an exemplary scenario is described. The exemplary HR CD 503 transmits one or more record objects to the MA1 508. The MA1 508 populates the CS1 520 with the one or more HR record objects 532 that the MA1 508 receives from the HR CD 503. The MA1 508 may transform, or otherwise format the one or more received HR record objects 532 according to various rules. Similarly, the exemplary IT CD 505 transmits one or more IT record objects to the MA2 510. The MA2 510 populates the CS2 522 with the one or more IT record objects 534 that the MA2 510 receives from the IT CD 505. The MA2 510 may transform, or otherwise format the one or more received IT record objects 534 according to various rules. Once in a CS region, the attribute values from the record objects may be transmitted into entity objects 538 in the metaverse 518 (central repository), in accordance with the various systems methods described above with respect to FIGS. 1-4.

Figure 6:
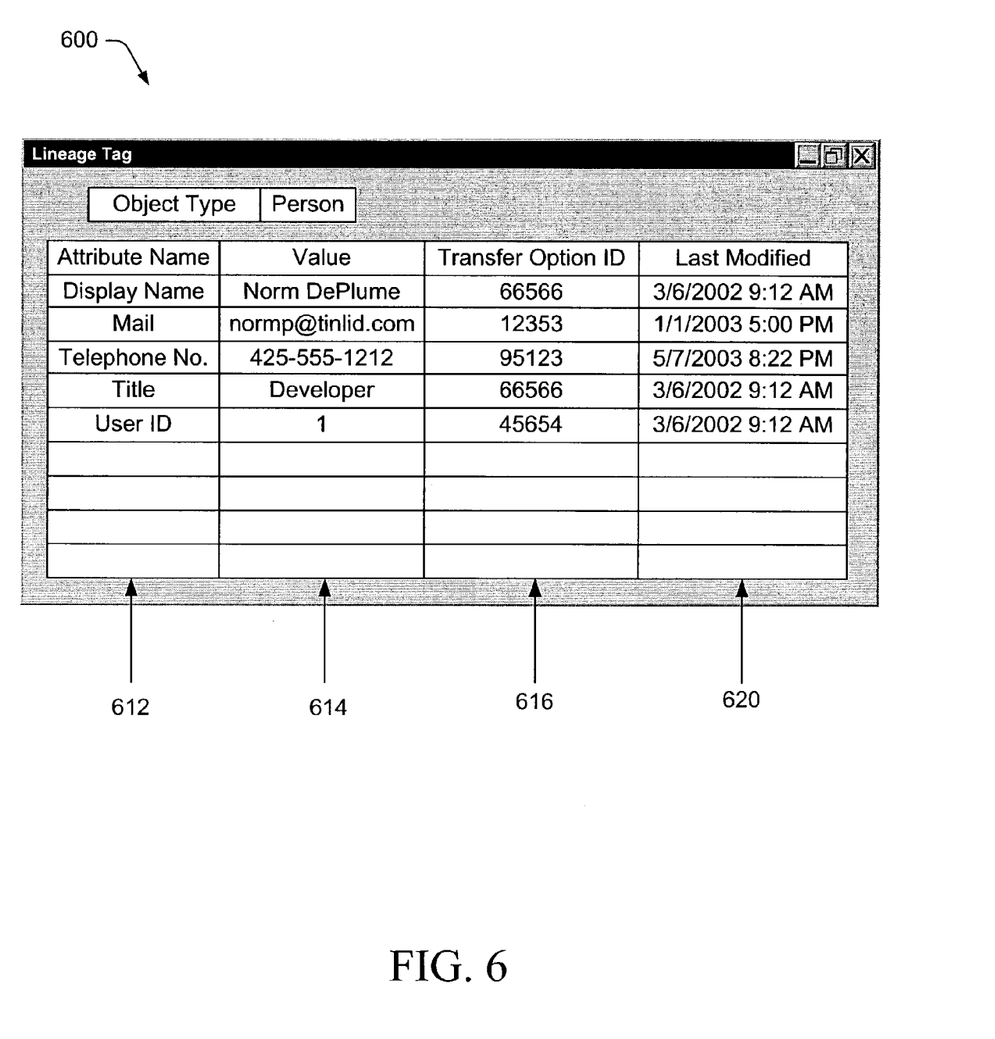
FIG. 6 illustrates a screen shot of an exemplary lineage tag information window produced by a user interface module of the data object storage system of FIG. 1.

Turning now to FIG. 6, illustrated therein is a screen shot of an exemplary lineage tag information screen or window 600 produced by the user interface module 130. In general, the exemplary lineage tag information window 600 provides a user with a graphical representation of the lineage tags 216 associated with, or contained within, an entity object 116. As shown, the exemplary lineage tag information window 600 is arranged and formatted as a table. Included in the table are columns for attribute names 612, attribute values 614, transfer option ID indicators 616, and time indicators 620. Displayed as such, a user may quickly determine or view various information associated with a given entity object. It should be understood that the selection and arrangement of the lineage tag elements shown in exemplary lineage tag information window 610 are not meant to be limiting. Those skilled in the art will appreciate that a lineage tag information window 600 may include more or fewer elements, and may be arranged in various other ways.

Figure 7:
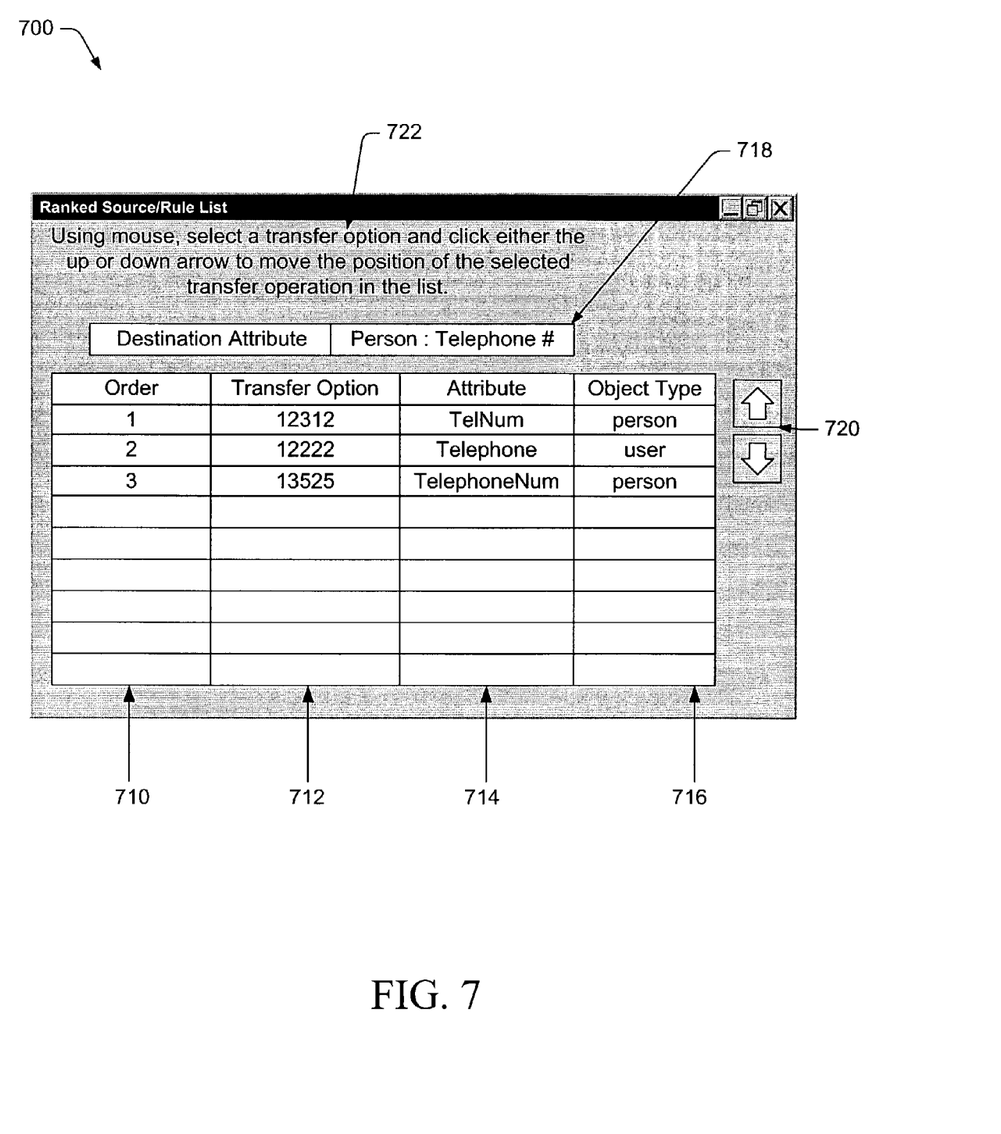
FIG. 7 illustrates a screen shot of an exemplary source ranked list window produced by a user interface module of the data object storage system of FIG. 1.
Figure 8:
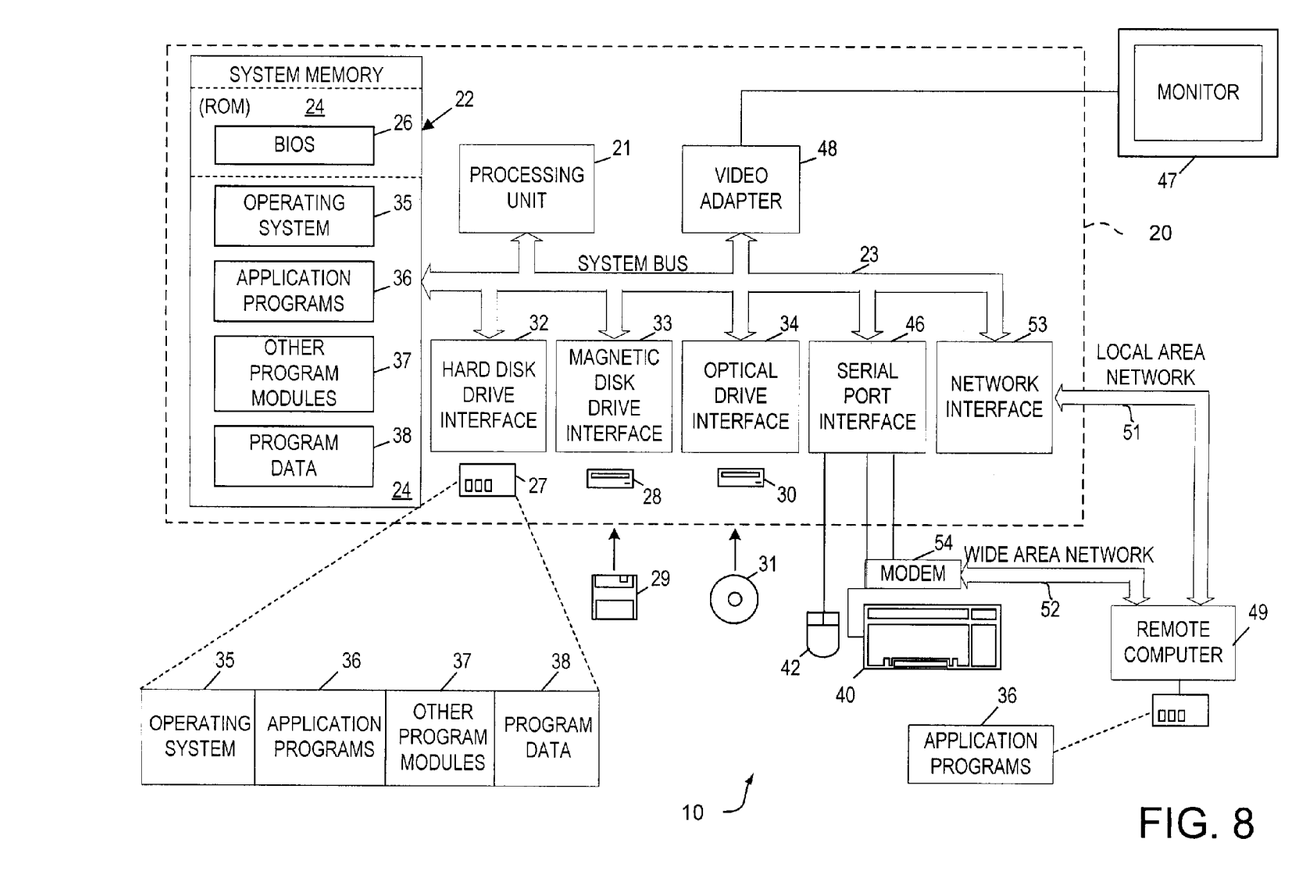
FIG. 8 illustrates an exemplary computing environment in which the data object storage system of FIG. 1 may be implemented.

FIG. 7 illustrates a screen shot of an exemplary ranked transfer operation list window 700 produced by the user interface module 130. In general, the exemplary ranked transfer operation list window 700 provides a user with a graphical representation of the order of transfer options used to populate a given entity attribute in an entity object, in accordance with the precedence data structure 120. Additionally, the exemplary ranked transfer operation list window 700 provides manner by which a user may quickly change the order of these transfer options in the ranked list.

As shown, the exemplary ranked transfer operation list window 700 is arranged and formatted as a table. Included in the table are columns for transfer operation ranks 610, transfer operation indicators 612, attribute indicators 614, and object type indicators 616. Also included in the exemplary ranked transfer operation list window 700 are a target attribute indicator 718, transfer operation positioning buttons 720, and textual directions 722. As show, the textual directions 722 provide directions for changing the position of a transfer operation in the exemplary ranked transfer operation list window 700. In particular, the textual directions 722 state "Using mouse, select a transfer operation and click either the up or down arrow to move the position of the selected transfer operation in the list.

It should be understood that the particular selection and arrangement of the various graphical elements shown in the exemplary ranked transfer operation list window 700 are not meant to be limiting. Those skilled in the art will appreciate that a ranked transfer operation list window 700 may include more or fewer elements, and may be arranged in various other ways. For example, and without limitation, rather than using a number to indicate transfer operations in the list, words or phrases may be used to more clearly specify the transfer operations to a user.

FIG. 7 illustrates one operating environment 10 in which the various systems, methods, and data structures described herein may be implemented. The exemplary operating environment 10 of FIG. 10 includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections may be achieved by a communication device coupled to or a part of the computer 20, or in other manners. The remote computer 49 may be another computer, a server, a router, a network PC, a client, a peer device or other common network node, and typically includes many or all of the elements described above relative to the computer 20, although only a memory storage device 50 has been illustrated in FIG. 12. The logical connections depicted in FIG. 12 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Various systems, methods, and data structures have been set forth that may be used in, or in conjunction with sharing information between interconnected data stores. The systems, methods, and data structures have been described as incorporating various elements or operations recited in the appended claims. It should be understood, however, that the preceding description is not intended to limit the scope of this patent. Rather, the inventors have contemplated that the claimed systems, methods, and data structures might also be embodied in other ways, to include different operations or elements, or combinations of operations or elements, similar to the ones described, in conjunction with other present or future technologies.

The invention claimed is:

1. A system for storage of related data comprising:
one or more processing units;
a system memory, wherein the system memory is coupled to the one or more processing units and wherein the system comprises:
an entity object having an entity attribute, wherein the entity attribute has an associated lineage tag;
a plurality of record objects, each record object having a record attribute value;
a user interface module communicating the value in the entity attribute;
a precedence data structure having an ordered set of transfer options, wherein the precedence data structure contains a plurality of ranked transfer options; and
a data management engine selecting one of the transfer options to populate the entity attribute using a record attribute value, wherein the selecting is based on information contained in the lineage tag of the entity object, and wherein populating the entity attribute comprises populating the entity attribute in the entity object using an entity attribute population rule defined in the selected transfer option, whereby populating the entity attribute facilitates keeping the value in the entity attribute up to date.

2. A system as defined in claim 1, wherein the entity attribute includes a plurality of attribute value fields.

3. A system as defined in claim 1, wherein the associated lineage tag includes a time indicator.

4. A system as defined in claim 1, wherein the ordered set of transfer options specifies a relative ranking of the transfer options based on the source of the transfer options.

5. A computer-readable storage medium, the medium having computer-executable instructions for performing acts comprising:
selecting one transfer option of a plurality of ranked transfer options based on information contained in a lineage tag of an entity object, wherein the plurality of ranked transfer options is included in a precedence data structure having an ordered set of transfer options;
populating an attribute value field in the entity object using the selected transfer option, wherein the act of populating the attribute value field comprises populating the attribute value field in the entity object using an entity attribute population rule defined in the selected transfer option, whereby populating the entity attribute facilitates keeping the value in the entity attribute up to date; and
communicating the value in the entity attribute via a user interface module.

6. A computer-readable storage medium as defined in claims 5, wherein the lineage tag includes an entity object population rule identifier.

7. A computer-readable storage medium as defined in claims 5, wherein the lineage tag includes a record attribute value source identifier.

8. A system for storage of related data comprising:
a processing means for processing;
a memory means for storing, wherein the memory means is coupled by a coupling means to the processing means and wherein the system comprises:
an entity object having an entity attribute;
a plurality of record objects, each record object having a plurality of record attribute values;
a means for communicating the value in the entity attribute to a user;
a selection means for selecting one transfer option of a plurality of ranked transfer options based on information contained in a lineage tag of an entity object, wherein the plurality of ranked transfer options is included in a precedence data structure having an ordered set of transfer options; and
an attribute population means for selecting one of the plurality of record attribute values for use in populating the entity attribute, wherein the attribute population means comprises means for populating the attribute using an entity attribute population rule defined in the selected transfer option, whereby populating the entity attribute facilitates keeping the value in the entity attribute up to date.

9. A systems as defined in claim 8, wherein the attribute population means uses a list of transfer options in selecting the one of the plurality of record attribute values.

10. A systems as defined in claim 8, wherein the attribute population means includes means for ordering the plurality of transfer options according to sources of the plurality of record attribute values.

11. A method implemented at least in part by a computing device, the method comprising:
facilitating attribute value selection for entity objects, wherein said facilitating comprises:
selecting one transfer option of a plurality of ranked transfer options based on information contained in a lineage tag of an entity object, wherein the plurality of ranked transfer options is included in a precedence data structure having an ordered set of transfer options;
populating an attribute value field in the entity object using the selected transfer option, wherein the act of populating the attribute value field comprises populating the attribute value field in the entity object using an entity attribute population rule defined in the selected transfer option, whereby populating the entity attribute facilitates keeping the value in the entity attribute up to date; and
communicating the value in the entity attribute via a user interface module.

12. A method for storing related data utilizing a computing device comprising:
associating a lineage tag with an entity object via an entity attribute;
identifying a plurality of record objects, each record object having a record attribute value;
communicating the value in the entity attribute, wherein the communicating occurs via a user interface module;
identifying a precedence data structure having an ordered set of transfer options, wherein the precedence data structure contains a plurality of ranked transfer options; and
selecting, wherein selecting occurs via a data management engine, one of the transfer options to populate the entity attribute using a record attribute value, wherein the selecting is based on information contained in the lineage tag of the entity object, and wherein populating the entity attribute comprises populating the entity attribute in the entity object using an entity attribute population rule defined in the selected transfer option, whereby populating the entity attribute facilitates keeping the value in the entity attribute up to date.

* * * * *